US006318658B1

(12) United States Patent
Kaneda et al.

(10) Patent No.: US 6,318,658 B1
(45) Date of Patent: Nov. 20, 2001

(54) TAPE CASSETTE WITH IMPROVED COVER OPERATION

(75) Inventors: Hiroshi Kaneda; Masatoshi Okamura, both of Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/621,499

(22) Filed: Jul. 21, 2000

(30) Foreign Application Priority Data

Jul. 22, 1999 (JP) .................................................. 11-207312

(51) Int. Cl.⁷ .................................................. G03B 23/02
(52) U.S. Cl. ........................................ 242/347.1; 360/132
(58) Field of Search ................................ 242/347, 347.1, 242/347.2, 346, 346.1; 360/96.5, 132

(56) References Cited

U.S. PATENT DOCUMENTS

| 5,023,740 | * | 6/1991 | Sasaki | ................................... | 360/132 |
| 5,596,464 | * | 1/1997 | Sawada | ................................... | 360/132 |
| 5,687,047 | * | 11/1997 | Mizutani et al. | ................................... | 242/347.1 X |
| 5,708,546 | * | 1/1998 | Taguchi | ................................... | 242/347.2 X |
| 5,717,554 | * | 2/1998 | Sawada | ................................... | 242/347.1 X |
| 6,011,675 | * | 1/2000 | Shima et al. | ................................... | 360/132 |
| 6,024,315 | * | 2/2000 | Morita et al. | ................................... | 242/347.1 |
| 6,181,516 | * | 1/2001 | Shima et al. | ................................... | 360/132 |

FOREIGN PATENT DOCUMENTS

| 8-87861 | 4/1996 | (JP) . |
| 11-110947 | 4/1999 | (JP) . |

* cited by examiner

Primary Examiner—William A. Rivera
(74) Attorney, Agent, or Firm—Darby & Darby

(57) ABSTRACT

A tape cassette capable of ensuring the opening and closing of a cover member, satisfying the specification requirement of a height of a rear cover and preventing the rear cover from interfering with a tape. The tape cassette includes a cover member having a front cover for covering the front surface of the tape before the front surface of a casing when the cassette is not used, an upper cover for covering from above the tape stretched outside the casing, and a rear cover for covering the rear surface of the tape. The front cover rotates when using the cassette, and the upper cover and the rear cover move interlockingly with each other to open the front surface of the casing. A cam portion for guiding the rear cover has a first inclined portion, a second inclined portion more inclined than the first inclined portion, and a perpendicular portion more inclined than the second inclined portion.

7 Claims, 8 Drawing Sheets

| ROTATION ANGLE (°) | HEIGHT OF REAR COVER (mm) | |
|---|---|---|
| | PRIOR ART | SPEC. |
| 0 | 0.8 | 0 |
| 5 | 1.038 | |
| 10 | 1.392 | 0.4 |
| 15 | 1.864 | |
| 20 | 2.486 | 2.4 |
| 25 | 3.201 | |
| 27 | 3.494 | |
| 30 | 3.92 | |
| 35 | 4.674 | |
| 40 | 5.433 | 4.7 |
| 45 | 6.258 | |
| 50 | 7.164 | |
| 55 | 8.177 | 7.1 |
| 60 | 9.325 | |
| 70 | 11.922 | 10.2 |
| 80 | 13.456 | |
| 85 | 13.755 | 13 |
| 90 | 13.82 | 13 |

TAPE CASSETTE WITH IMPROVED COVER OPERATION

BACKGROUND OF THE INVENTION

1. Field of the Invention

The present invention relates to a tape cassette including a casing which accommodates a tape reel wound with a tape and a cover member for protecting the tape, and more particularly to a tape cassette having front, upper and rear covers as cover members.

2. Related Background Art

A tape cassette including three pieces of cover members, i.e., front, upper and rear covers, has thitherto been known as, e.g., a DVC (Digital Video Cassette). In this type of tape cassette, the tape exposed outside the cassette in front of the casing is protected by being covered with the front, upper and rear covers when unused. FIGS. 4A and 4B are side views each showing the conventional cassette tape. As illustrated in FIGS. 4A and 4B, a front cover 103 is rotated when using the tape cassette 101, and an upper cover 104 and a rear cover 105 move interlocking with the rotation of the front cover 103 and thus open the front surface of a casing 102.

As indicated by a broken line in FIG. 4B, when the front cover 103 rotates upward, the upper cover 104 rotates about rotary spindles 106, and moves rightwards in FIG. 4B while being guided at its guide spindles 104a along a guide groove 107 of the casing 102. Simultaneously, the rear cover 105 rotates about its rotary spindles 105a and moves upwards while being guided at its guide spindles 105b along a cam groove 108 of the casing 102. As shown in FIG. 4A, when the front cover 103 rotates farther upwards, the front surface of the casing 102 opens, and at the same time the tape 100 is released from a state of being protected by the front, upper and rear covers. At this time, a front side end of the rear cover 105 moves while depicting a trajectory x by a one-dotted chain line in FIG. 4A.

As to a configuration of the guide groove for guiding the upper cover described above, Japanese Patent Application Laid-Open Publication No. 8-87861 discloses that the upper cover slides easier with the guide grooves having a smaller inclined angle, however, it is undesirable that the rear cover, if under 35 degrees, interlocking therewith might interfere with the tape.

Japanese Patent Application Laid-Open Publication No.11-110947 discloses that a slide resistance caused by opening the cover member decreases when an opening angle of the front cover is within a range of 0 to 30 degrees, and gives a specification value for a relation between an opening angle of the front cover and a height of the rear cover when the cover member of the tape cassette opens (FIGS. 18 and 19).

As described above, in the tape cassette having the cover body composed of three pieces of the cover members, the cover body is easy to open, but there are problems in terms of the interference between the rear cover and the tape and a restriction based on the specification requirement of the height of the rear cover when the cover body opens. It is required that those factors be taken and a graph, wherein there is given a specification value of a height of the rear cover 105 from a bottom surface of the casing with respect to a rotation angle γ of the front cover 103 in FIG. 4B. In the tape cassette in the prior art, the rear cover has a height C satisfying the specification requirement. In the example shown in FIG. 4B, the height C of the rear cover is 4.6 mm as compared with a specification value of 4.0 mm when the rotation angle γ is 35 degrees. Further, as shown in the graph in FIG. 5 it can be comprehended that the height C of the rear cover tends to approximate the specification value when the rotation angle (opening angle) γ is within a range of 20 to 45 degrees.

The prior art tape cassette shown in FIGS. 4A and 4B has, however, a problem in which an inclined angle θ of an inclined portion 107a of the guide groove 107 for guiding the upper cover 104 is approximately 50 degrees with a large resistance caused when opening the cover body, and cuttings are produced in the guide groove and the guide spindles by this resisting force as the case may be. Such being the case, for reducing the resistance when opening the cover body, as shown in FIG. 6, if the inclined angle θ of the inclined portion 107a of the guide groove 107 is set stepwise smaller than 50 degrees, as shown in FIG. 7, the front cover opens at the rotation angle γ within a range of 25 to 45 degrees, and the height C of the rear cover approximates the specification value. Then, when the inclined angle θ comes to 30 degrees, the specification value is not met. In the example shown in FIG. 6, when the rotation angle γ of the front cover is 35 degrees, the height C of the rear cover is 4.2 mm as compared with the specification value of 4.0 mm at the inclined angle θ of 35 degrees.

Then, as shown in FIGS. 8A and 8B, if contrived so that the inclined angle of the inclined portion 108a of the cam groove 108 for guiding the rear cover 105 is increased and the rear cover 105 is moved fast up to a high position, in an example in FIG. 8B, when the rotation angle γ of the front cover is 35 degrees, the height C of the rear cover is 4.7 mm for the specification value of 4.0 mm at the inclined angle θ of 30 degrees, which sufficiently satisfies the specification requirement. While on the other hand, however, as indicated by a trajectory x' of a front side end of the rear cover 105 in FIG. 8A, the rear cover 105 gets close to the tape and interferes with the tape with the result that the tape might undesirably be damaged.

SUMMARY OF THE INVENTION

It is a primary object of the present invention to provide a tape cassette capable of ensuring the opening and closing of a cover body, satisfying a specification requirement of a height of a rear cover, and preventing the rear cover from interfering with a tape.

To accomplish the above object, according to one aspect of the invention, a tape cassette includes a pair of tape reels wound with a tape-like member, a casing for accommodating the tape reels in a rotatable manner, and a cover member for protecting the tape-like member stretched outside the casing when the cassette is not used. The cover member includes a front cover having side plates pivotally supported on side surfaces of the casing, and a front plate, rotating together with the side plates, for covering a front surface of the tape-like member before the front surface of the casing when the cassette is not used, an upper cover, connected on its one end side to an upper end portion of the front cover and interlocking with a rotation of the front cover while being guided along guide portions provided in the side surface of the casing on its other end side, for covering from above the tape-like member stretched outside the casing when the cassette is not used, and a rear cover, connected at its upper end portion to the upper cover and interlocking with the movement of the upper cover while being guided by a cam portion provided in the casing, for covering a rear surface of the tape-like member when the cassette is not used. The front cover is biased in such a direction as to cover the front surface of the tape-like member and rotates against the biasing force when using the cassette, whereby the upper cover and the rear cover move interlocking with each other to open the front surface of the casing. The guide portion includes a horizontal portion provided on a rear side of the cassette, and an inclined portion provided on the side of the front surface of the cassette and inclined to the horizontal portion. The cam portion includes a first inclined portion, inclined to the lower surf ace of the casing, for guiding the rear cover so as to move away from the tape-like member when the front cover starts rotating to open the front surface of the casing, a second inclined portion, inclined much slant than the first inclined portion, for subsequently guiding the rear cover upwards of the casing, and a perpendicular portion inclined much slant than the second inclined portion and substantially perpendicular to the lower surface of the casing.

According to the tape cassette, when the front cover rotates to open the front surface of the casing, the rear cover is at first guided by the first inclined portion to thereby smoothly move fast away from the tape-like member. Next, the rear cover is guided by the second guide portion to thereby move faster upwards of the casing. Subsequently, along the perpendicular portion, the rear cover moves much faster upwards of the casing. A resistance caused when opening the front cover can be thereby reduced, and it is also feasible to prevent a contact and interference between the tape-like member and the rear cover. Besides, a specification requirement of a height of the rear cover can be met. Accordingly, the tape cassette exhibiting a high reliability can be realized.

Further, it is preferable an angle of the inclined portion of the guide portion to the horizontal portion be 25 to 45 degrees. With this contrivance, the resistance caused when opening the front cover does not increase, and the guide portion can be prevented from being worn away. Besides, the specification value of the height of the rear cover can be met.

Furthermore, when the front cover rotates at the rotation angle within a range of 20 to 45 degrees with respect to the lower surface of the casing, it is preferable that the rear cover be constructed to be guided by the second inclined portion. As shown in FIG. 5, the height C of the rear cover tends to approximate the specification value when the rotation angle (opening angle) γ of the front cover is within the range of 20 to 45 degrees. When the front cover rotates within the range of the rotation angle, however, the rear cover moves faster upwards of the casing while being guided by the second inclined portion, and thus moves away from the tape-like member, therefore it is possible to surely prevent the contact and interference between the tape-like member and the rear cover.

Moreover, it is preferable in terms of obtaining the operational effects described above that an angle of the first inclined portion be 30 to 40 degrees, and an angle of the second inclined portion be 70 to 80 degrees.

DETAILED DESCRIPTION OF THE PREFERRED EMBODIMENT

Figure 1:
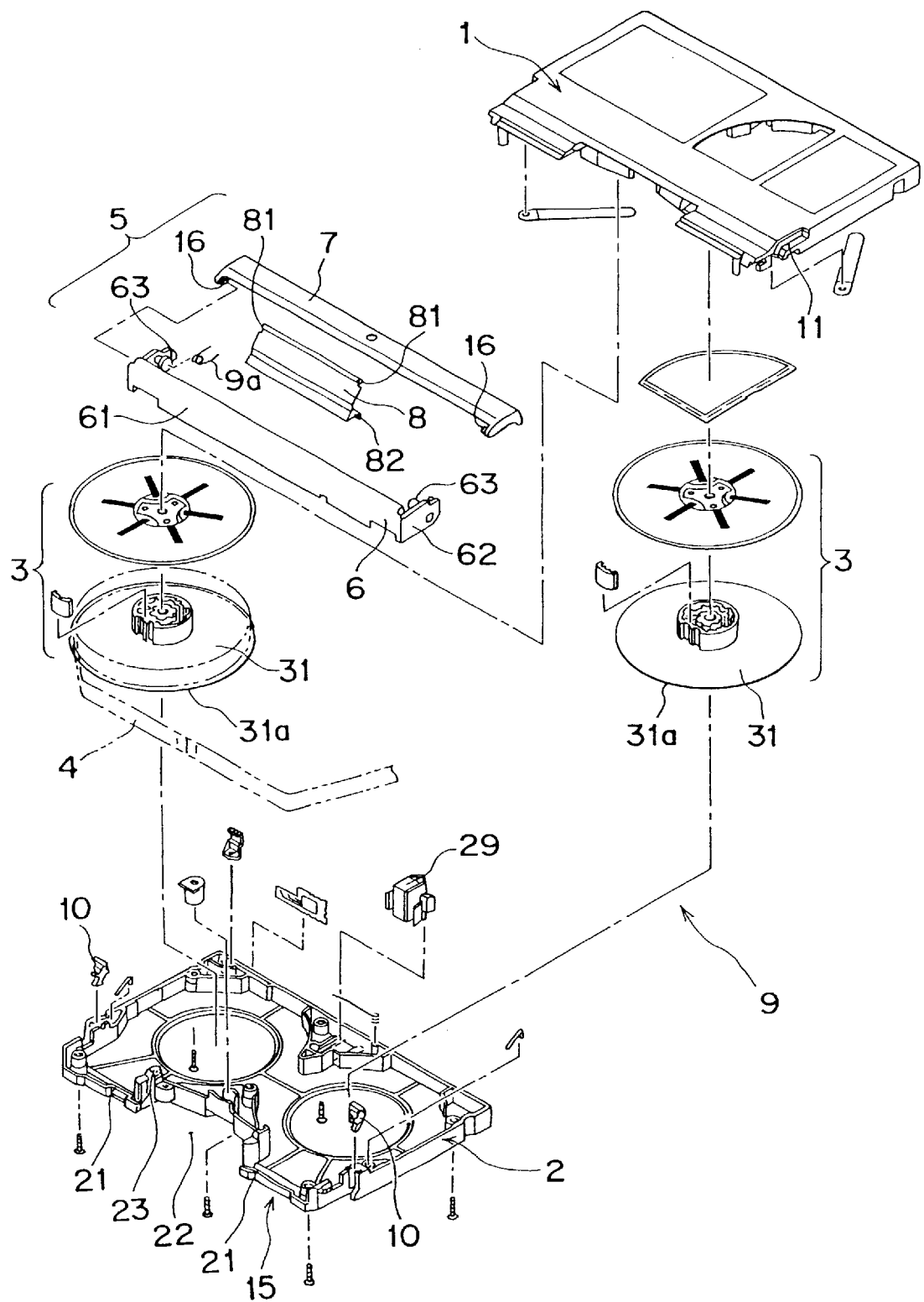
FIG. 1 is an exploded perspective view showing a tape cassette in one embodiment.
Figure 2A:
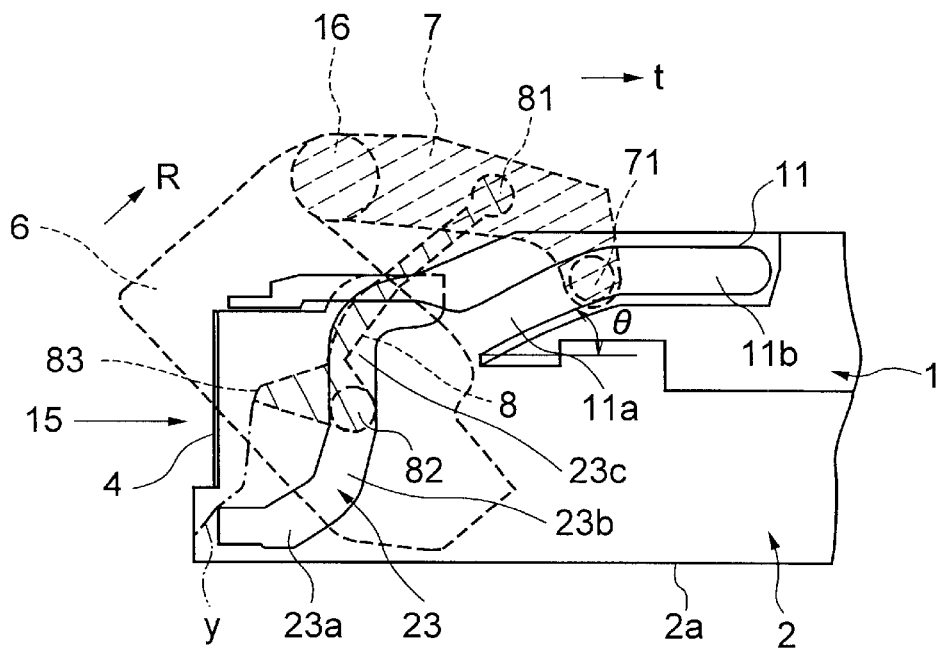
FIGS. 2A and 2B are side views showing principal portions on the side of a front surface of the tape cassette in FIG. 1.
Figure 2B:
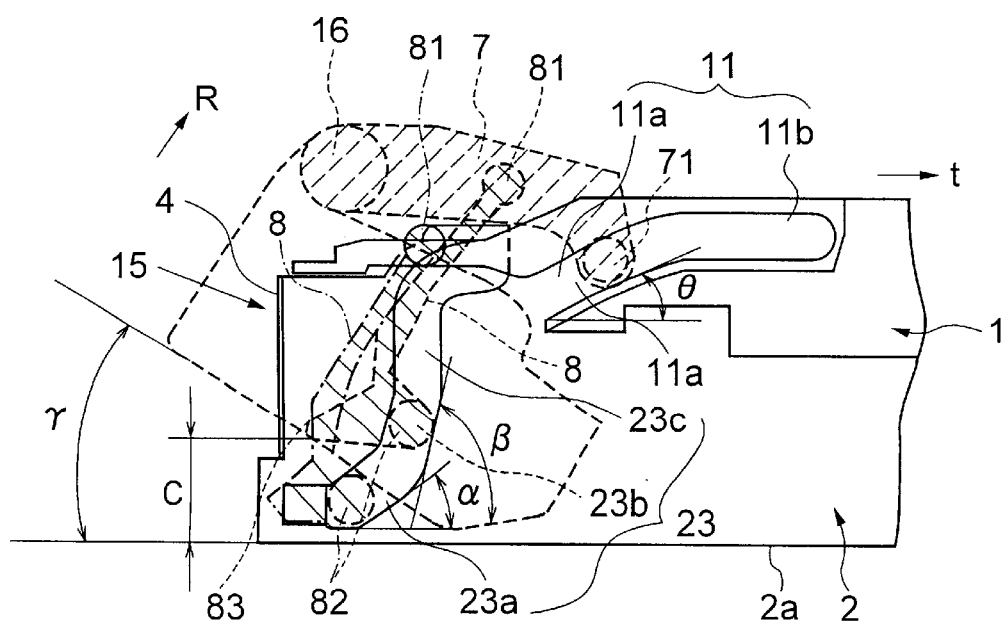

A preferred embodiment of the present invention will hereinafter be described with reference to the accompanying drawings. FIG. 1 is an exploded perspective view of a tape cassette categorized as a DVC (Digital Video Cassette) in one embodiment of the present invention. FIGS. 2A and 2B are side views showing principal portions of the tape cassette in FIG. 1. As shown in these Figures, a tape cassette 9 has such a configuration that a casing constructed of an upper casing 1 and a lower casing 2 accommodates a pair of tape reels 3, 3 rotatable and wound with a tape 4 as a magnetic recording medium. The tape 4 is, as indicated by a two-doted chain line in FIG. 1, wound on one of the tape reels 3, 3 and rewound on the other reel 3. Gear teeth 31a, 31a are formed on external peripheral surfaces of lower flanges 31, 31 of the tape reels 3, 3. The gear teeth 31a, 31a engage with a reel brake member 29 when the cassette is not used, thereby preventing the tape reel 3 from rotating and also preventing the tape from loosening.

The tape 4 moving between the pair of tape reels 3, 3 appears outside a casing front surface 15 between openings 21, 21 formed in the lower casing 2. The tape 4 exposed before the casing front surface 15 is protected by a cover member 5 when the cassette is not used. When the tape cassette is set in a recording/reproducing apparatus and then used, the cover member 5 moves, and the tape is released from its protection, then exposed.

An explanation about the cover member 5 will be given. The cover member 5 includes three pieces of cover members such as a front cover 6, an upper cover 7 and a rear cover 8. The front cover 6 has a front plate 61 and side plates 62, 62 provided at right and left side ends. The front plate 61 is so constructed as to cover a front surface of the tape 4 when the cassette is not used. The side plates 62, 62 are provided with rotary spindles 63, 63. The front cover 6 is attached pivotally to the casing by the rotary spindles 63, 63. When the cassette is not used, the front cover 6 rotates, whereby the casing front surface 15 is opened. Further, a spring member 9a is secured to one of the rotary spindles 63 of the front cover 6, whereby the front cover 6 is always biased in a closing direction.

The upper cover 7 has substantially the same width as that of the front cover 6 with respect to the front surface of the casing, and is rotatably connected at its front end surface to an upper portion of the front cover 6 through rotary spindles 16, 16. A guide spindle 71 (see FIGS. 2A and 2B) guided along a guide groove 11 formed in two side surfaces of the upper casing 1 on the opposite side to the connecting portion of the upper cover 7. The upper cover 7 covers from above the tape 4 exposed before the front surface of the casing when the cassette is not used and moves backwards (towards the opposite side to the front surface 15) of the cassette, interlocking with the rotation of the front cover 6 when used.

The rear cover 8 has a width equal to a tape loading recessed portion 22 defined as a space formed between the opening 21 and the opening 21. The rear cover 8 includes rotary spindles 81, 81 provided at an upper side end thereof and rotatably connected to an inner surface of the upper cover 7, and a guide spindle 82 provided on a lower end side is guided along a cam groove 23 formed in two side walls of the lower case formed with the recessed portion 22. The rear cover 8 covers a rear surface side of the tape 4 exposed before the casing front surface 15 when the cassette is not used, and moves so as to retract upwardly of the cassette, interlocking with the rotation of the front cover 6 when in use. As described above, the cover member 5 is constructed such that the upper and rear covers 7 and 8, with the front cover 6 rotated, move interlocking this rotation. Further, as shown in FIG. 1, the cover member 5 is so constructed as to be locked by cover lock members 10, 10 when the cassette is not used, thus making all possible contrivances for protecting the tape.

As shown in FIGS. 2A and 2B, the cam groove 23 has, for guiding the guide spindle 82 of the rear cover 8, a first inclined portion 23a inclined at an inclined angle α of 30 to 40 degrees to the lower surface 2a of the casing so that the cover member 5 moves fast away from the tape 4 when the cover member 5 starts opening, a second inclined portion 23b inclined likewise at an inclined angle β of 70 to 80 degrees in order to guide much faster the rear cover 8 upwards, and perpendicular portion 23c provided after the second inclined portion 23b and substantially perpendicular to the lower surface 2a.

The guide groove 11 includes, for guiding the guide spindle 71 of the upper cover 7, an inclined portion 11a formed on the side of the casing front surface 15 and inclined at an inclined angle θ of 25 to 40 degrees to the lower surface 2a of the casing, and a horizontal portion 11b formed on the rear side of the casing and substantially parallel to the casing lower surface 2a.

An operation of the thus constructed cover member 5 will be explained. When the tape cassette is set in the recording/reproducing apparatus, after being unlocked by the cover lock members 10 and 10, the front cover 6 is moved by the drive member (not shown) of the apparatus and is thereby rotated in a rotary direction R in FIGS. 2A and 2B about the rotary spindle 63. With this rotation of the front cover 6, the upper cover 7 is pushed in a direction t (towards the rear surface of the cassette) in FIGS. 2A and 2B while slightly rotating about the rotary spindles 16, and the guide spindle 71 moves in the direction t while being guided along the inclined portion 11a and the horizontal portion 11b of the guide groove 11.

Simultaneously, with the upper cover 7 moving with the rotations of the front cover 6, from a position indicated by a one-dotted chain line in FIG. 2B, a lower end portion 83 of the rear cover 8, as indicated by a trajectory y shown by a one-dotted chain line in FIG. 2A, moves upward away from the tape 4 comparatively fast while the guide spindle 82 is guided along he first inclined portion 23a of the cam groove 23. Subsequently, the lower end portion 83 of the rear cover 8 is guided upwards faster along the second inclined portion 23b (a broken line position in FIG. 2B) and further guided upward much faster along the perpendicular portion 23c (a position in FIG. 2A).

The front cover 6 is further rotated in a direction R, whereby the casing front surface 15 is fully opened while the upper cover 7 and the rear cover 8 further move. Then, the reel brake member 29 disengages from the gear teeth 31a of the tape reel 3, and thereafter the tape reels 3, 3 are rotationally driven, thereby moving the tape 4. A recording on and reproduction from the tape 4 are carried out by the recording/reproducing apparatus. When the front cover 6 is released from being driven after the operation described above has been finished, the front cover 6 is rotated in the direction reversal to the direction described above by a biasing force of a spring member 9a, and the upper cover 7 and the rear cover 8 reverts to the previous state of protecting the tape 4, interlocking with the rotation of the front cover 6.

Figure 3:
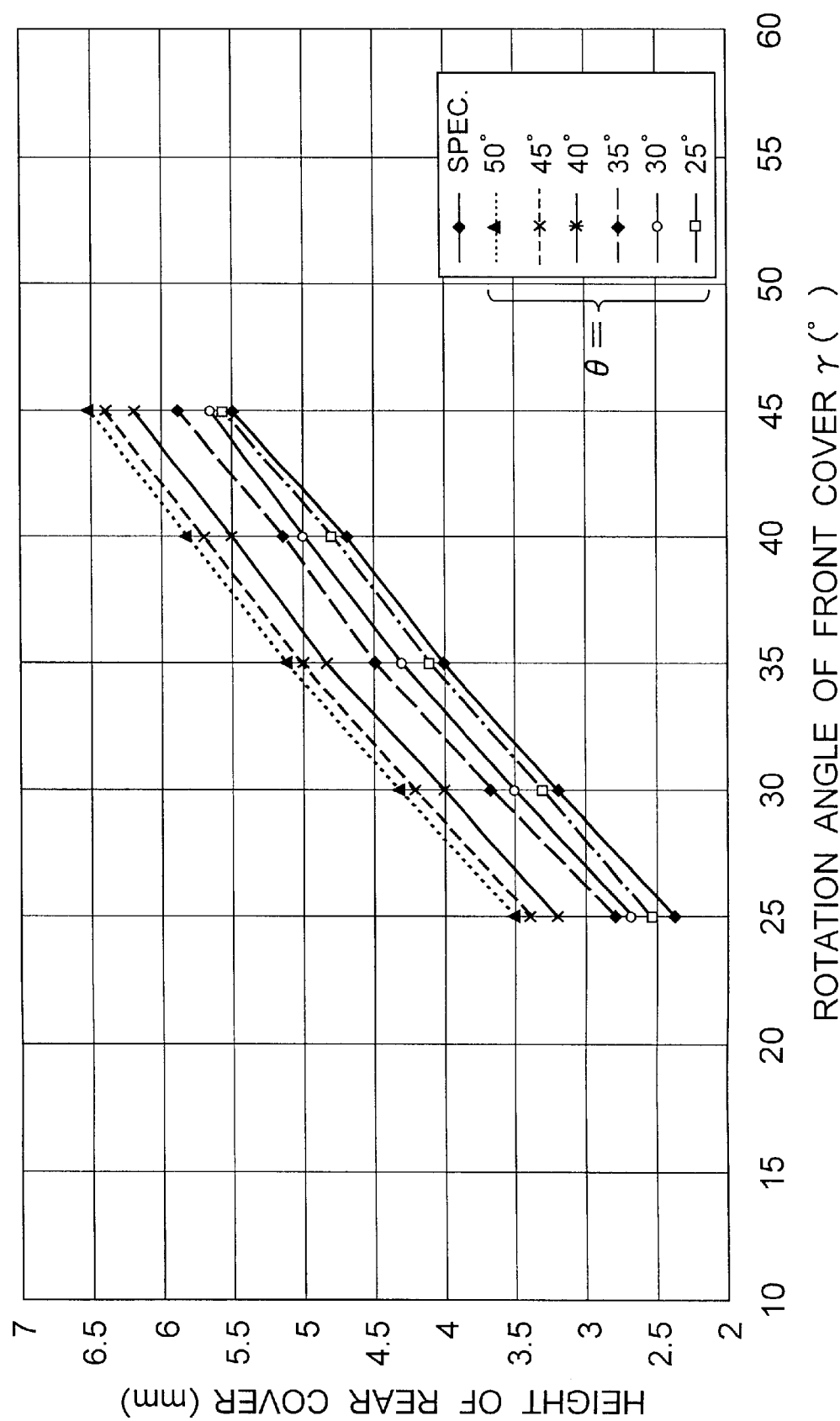
FIG. 3 is a graph showing a relation between a rotation angle γ of a front cover and a height C of a rear cover of the tape cassette in FIG. 1 in a way of changing an inclined angle of an inclined portion of a guide groove.
Figure 4A:
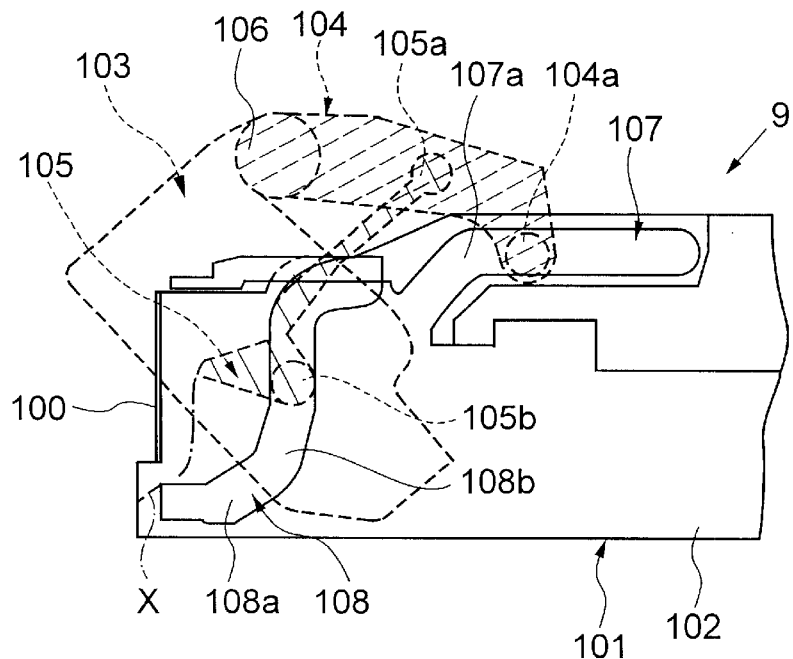
FIGS. 4A and 4B are side views showing principal portions on the side of a front surface of a conventional cassette tape.
Figure 4B:
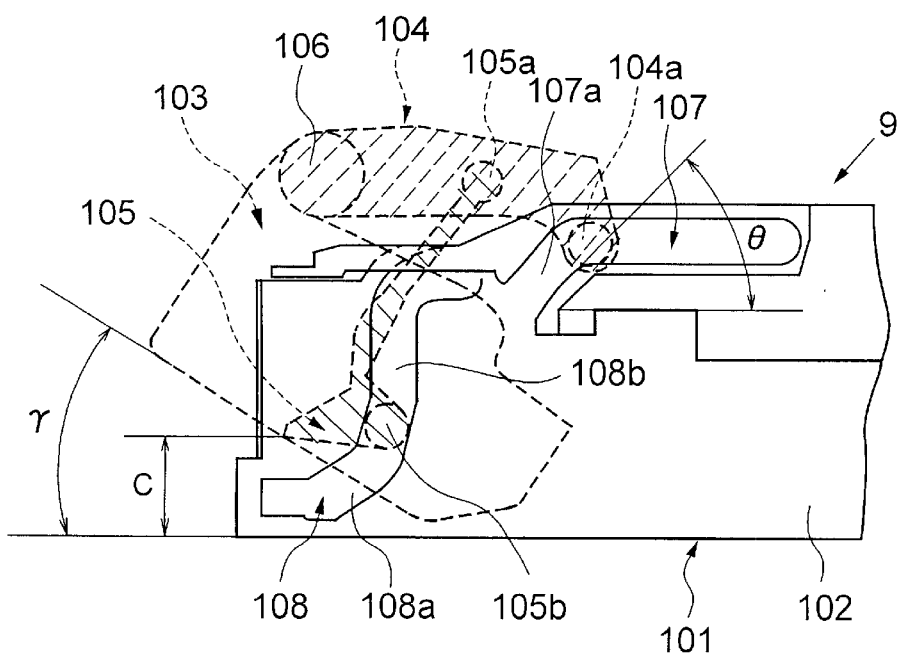

As explained above, it is preferable that the inclined angle α of the first inclined portion 23a of the cam groove 23 be set to 30 to 40 degrees, and the inclined angle β of the second inclined portion 23b thereof be set to 70 to 80 degrees. FIG. 3 is a graph showing a rotation angle γ of the front cover 6 and a height C of the rear cover 8 from the casing lower surface 2a to the lower end portion 83 when the inclined angle θ of the inclined portion 11a of the guide groove 11 is changed by every 5 degrees from 25 degrees up to 50 degrees in the tape cassette having the thus constructed cam groove in the present embodiment. As can be understood from FIG. 3, the specification requirement of the height C of the rear cover can be satisfied even when the inclined angle θ of the inclined portion 11a of the guide groove 11 is set to 25 degrees in this embodiment. Accordingly, the inclined angle θ can be set in an angle range of 25 to 40 degrees with relatively gentle slopes, and hence the guide spindle 71 can be smoothly guided along the guide groove 11, and there might be no possibility in which drawbacks such as wearing away, etc. occur in the guide grooves and the guide spindle 71.

Further, as discussed above, upon the rotation of the front cover 6, the lower end portion 83 of the rear cover 8 quickly moves away from the tape and rises at an early stage of starting its movement along the first inclined portion 23a, and subsequently further ascends faster away from the tape along the second inclined portion 23b with a steeper slope. It is therefore possible to prevent interference caused by the contact between the tape and the lower end portion. That is, the lower end portion 83 of the rear cover 8 constantly moves away from the tape 4 as indicated by the trajectory in FIG. 2A, and hence the lower end portion does not come into contact with the tape, with no problem of causing the interference with the tape 4. In the case of FIGS. 2A and 2B, a gap on the order of 0.8 mm is formed between the tape 4 and the rear cover 8 when the tape 4 and the rear cover 8 get closest to each other. Further, when both of the inclined angle θ of the inclined portion 11a of the guide groove 11 and the rotation angle γ of the front cover 6 are 35 degrees, the height C of the rear cover is 4.5 mm as compared with the specification value of 4.0 mm.

Moreover, if the inclined angle θ of the inclined portion 11a of the guide groove 11 is less than 25 degrees, the height C of the rear cover becomes approximate to the specification value, and therefore the angle is preferably equal to 25 degrees or greater. Further, if over 40 degrees, the problem of wearing away, etc. might easily occur, and therefore the angle is preferably equal to 40 degrees or larger. Further, if the inclined angle α of the first inclined portion 23a of the cam groove 23 is smaller than 30 degrees, the height C of the rear cover becomes approximate to the specification value, and is therefore preferably equal to or larger than 30 degrees. If over 40 degrees, the rear cover gets close to the tape, and it is therefore preferable that the above angle be under 40 degrees.

Figure 5:
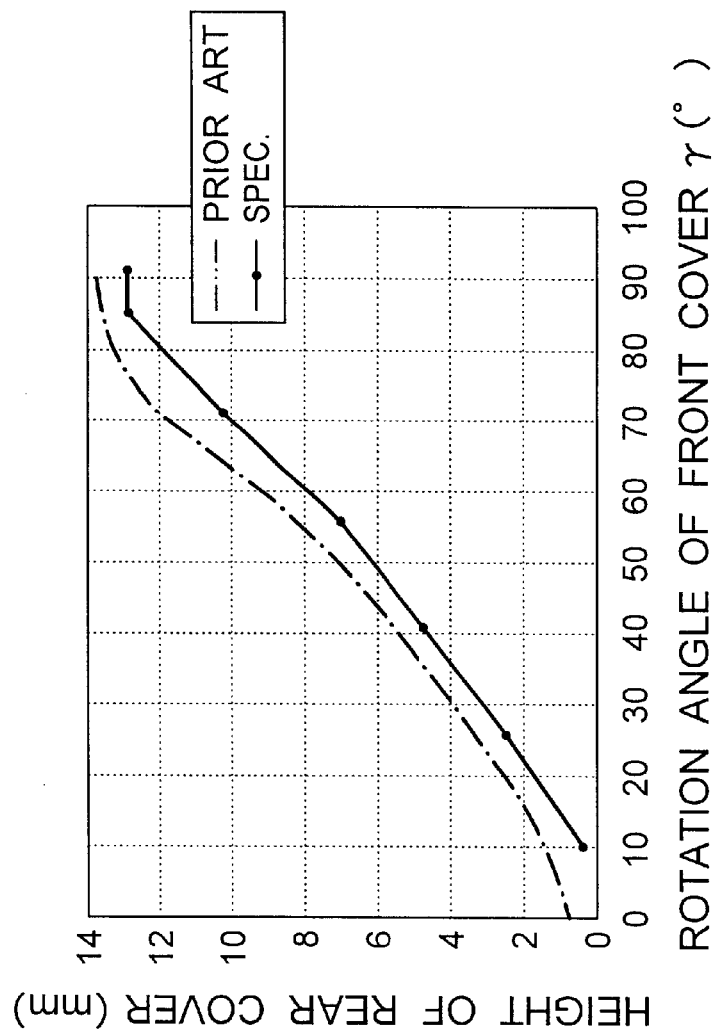
FIG. 5 is a graph showing a relation between the rotation angle of the front cover and the height of the rear cover of the conventional tape cassette (in a comparison in terms of specification value in the prior art example)
Figure 6:
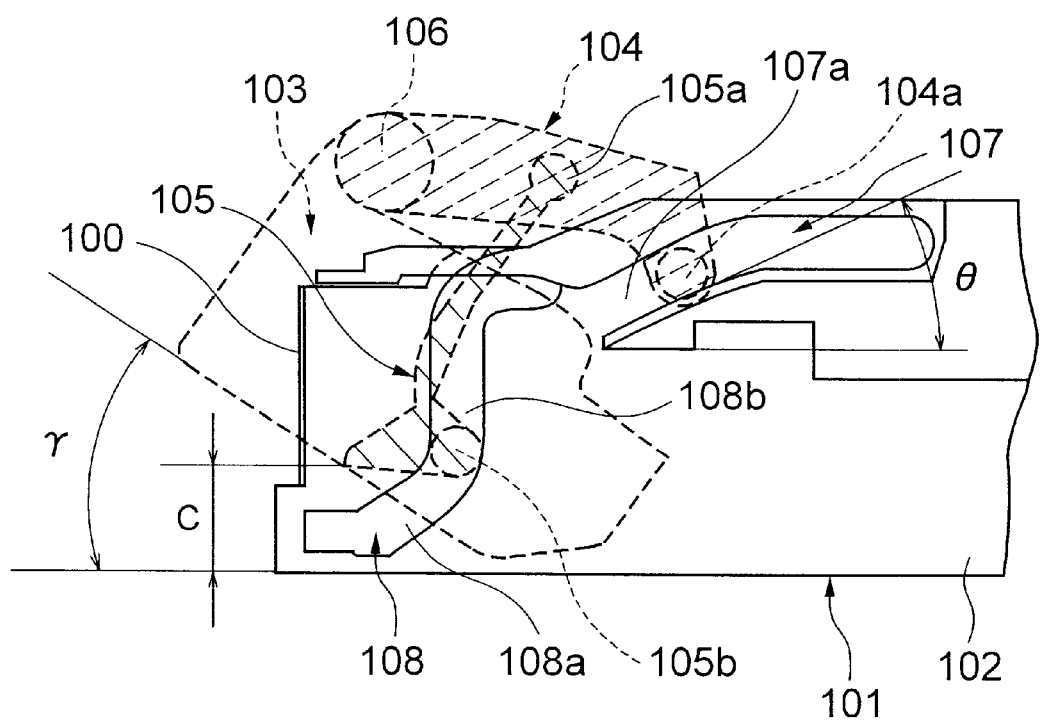
FIG. 6 is a side view of the principal portions, showing an example of decreasing the inclined angle of the inclined portion of the guide groove in the prior art example in FIG. 4.
Figure 7:
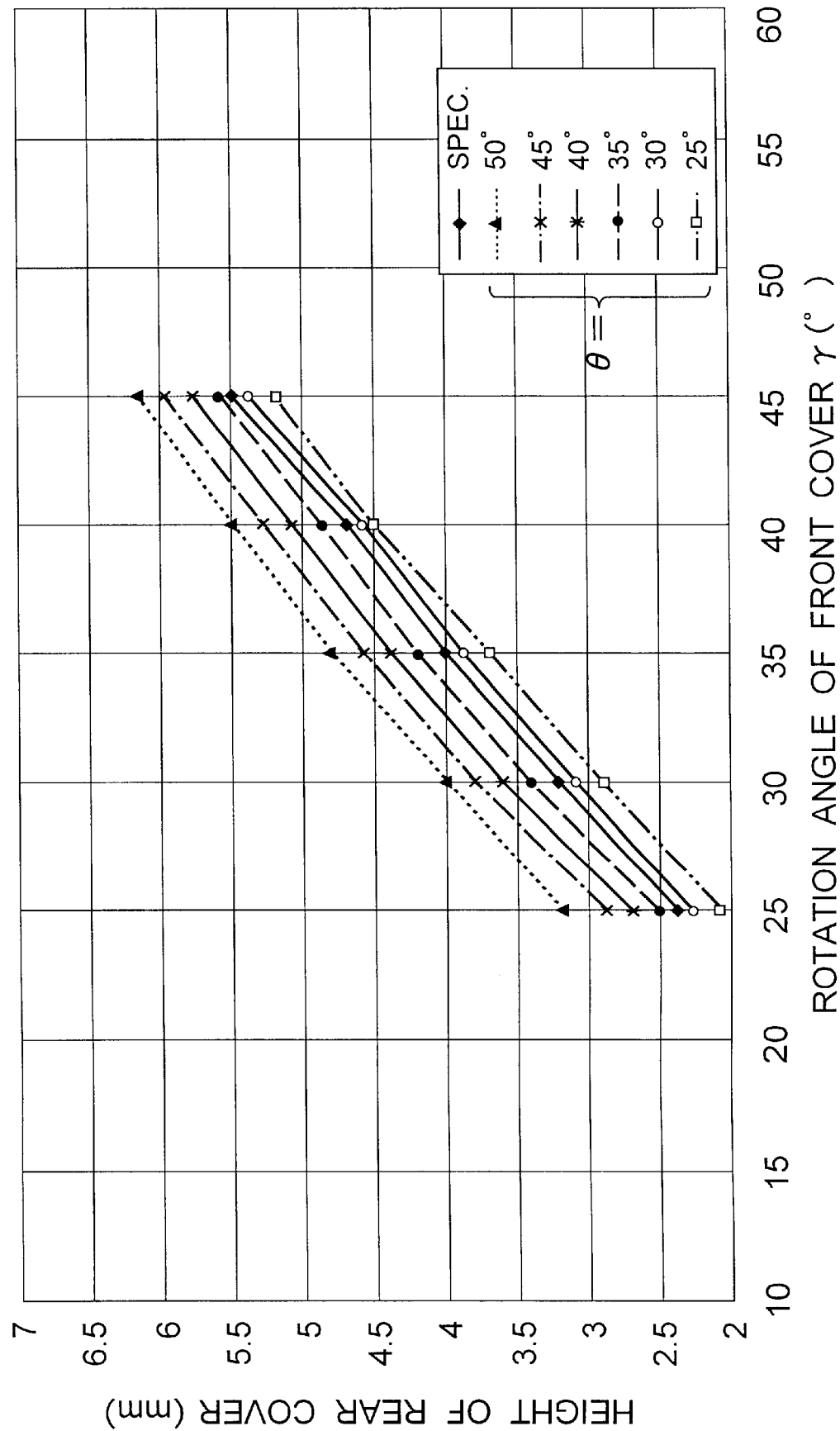
FIG. 7 is a graph showing a relation between a rotation angle of the front cover and a height of the rear cover of the tape cassette in a way of changing the inclined angle of the inclined portion of the guide groove in the prior art example in FIG. 4.
Figure 8A:
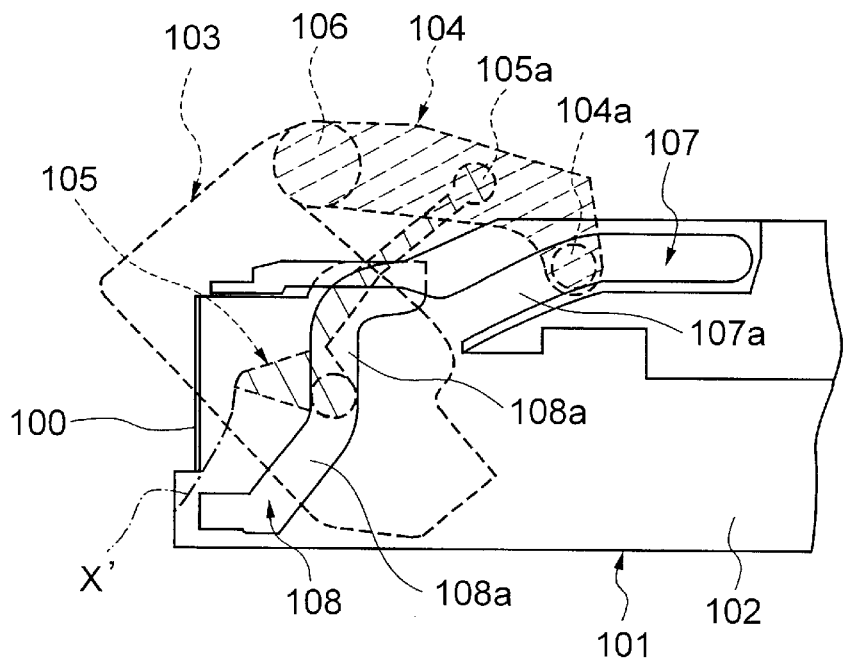
FIGS. 8A–8B collectively show is a side view of the principal portions, showing an example of increasing the inclined angle of the inclined portion of the cam groove in the example in FIG. 6.
Figure 8B:
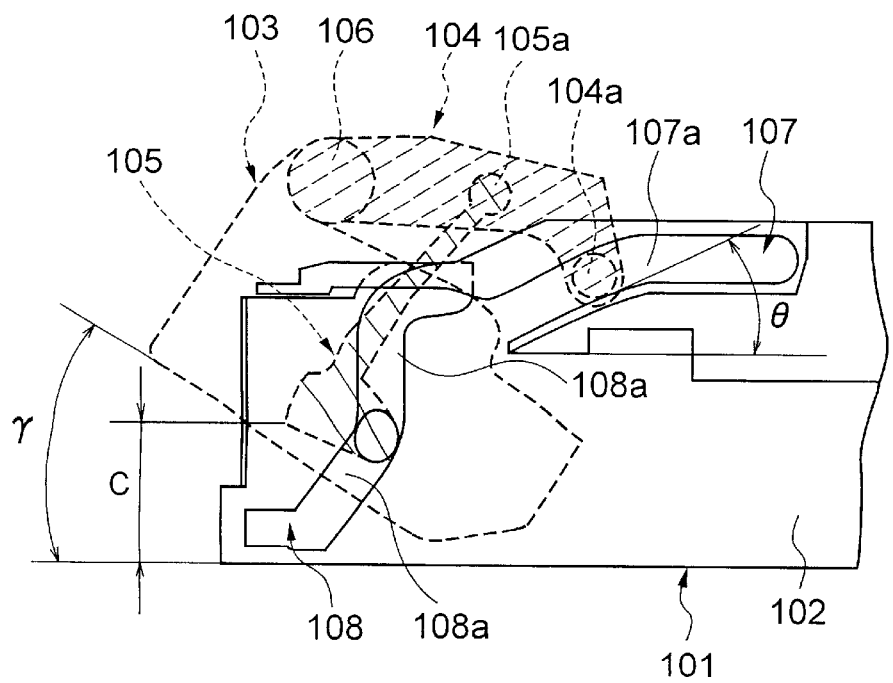

Moreover, referring to FIG. 3, the range of the rotation angle γ of the front cover 6 is defined strictly by 25 to 45 degrees. The reason why so is, as in the case of FIG. 5, that the height C of the rear cover approximates most the specification value in this range with no allowance for the specification value. Further, from the same reason, it is preferable that the rear cover 8 be guided along the second inclined portion 2b when the front cover 6 is opened at its rotation angle γ within the range of 20 to 40 degrees. With this contrivance, the rear cover 8 is guided by the second inclined portion 2b and moves away from the tape 4 much faster, and it is therefore feasible to surely prevent the contact and the interference between the tape 4 and the rear cover 8.

The present invention has been discussed so far by way of the embodiment but is not limited to this embodiment. The present invention may be modified in a variety of forms without departing from the scope of the technical concept of the present invention. For example, the tape-like member may embrace a tape for cleaning, etc. other than the magnetic recording medium tape. Moreover, the present invention can be, as a matter of course, applied to any size of tape cassettes. Further, the inclined portions of the guide groove and of the cam groove are not necessarily rectilinear and may take, e.g., a circular arc shape.

According to the present embodiment, it is possible to provide the tape cassette including the cover member that can be surely opened and closed and constructed so that the specification requirement of the height of the rear cover is satisfied and the rear cover does not interfere with the tape-like member.

What is claimed is:

1. A tape cassette comprising:

a pair of tape reels wound with a tape-like member;

a casing for accommodating said tape reels in a rotatable manner; and a cover member for protecting said tape-like member stretched outside said casing when said cassette is not used, wherein said cover member includes:

a front cover having side plates pivotally supported on side surfaces of said casing, and a front plate, rotating together with said side plates, for covering a front surface of said tape-like member before the front surface of said casing when said cassette is not used;

an upper cover, connected on one side to an upper end portion of said front cover, and interlocking with a rotation of said front cover while being guided on its other side along guide portions provided in the side surface of said casing, for covering from above said tape-like member stretched outside said casing when said cassette is not used; and a rear cover, connected at an upper end portion to said upper cover, and interlocking with the movement of said upper cover while being guided by a cam portion provided in said casing, for covering a rear surface of aid tape-like member when said cassette is not used, said front cover is biased in such a direction as to cover the front surface of said tape-like member, and rotates against the biasing force when using the cassette, whereby said upper cover and said rear cover move interlocking with each other to open the front surface of said casing, said guide portion includes a horizontal portion provided on a rear side of said cassette, and an inclined portion provided on the side of the front surface of said cassette and inclined to said horizontal portion, and said cam portion includes a first inclined portion, inclined to the lower surface of said casing at an angle of about 30 to about 40 degrees, for guiding said rear cover so as to move away from said tape-like member when said front cover starts rotating to open the front surface of said casing, a second inclined portion, more inclined than said first inclined portion, for subsequently guiding said rear cover upwards of said casing, and a perpendicular portion inclined substantially perpendicular to the lower surface of said casing.

2. A tape cassette according to claim 1, wherein an angle of said inclined portion of said guide portion to said horizontal portion is 25 to 45 degrees.

3. A tape cassette according to claim 1, wherein said rear cover is guided by said second inclined portion when said front cover rotates at a rotation angle within a range of 20 to 45 degrees to the lower surface of said casing.

4. A tape cassette according to claim 1, wherein an angle of said second inclined portion is 70 to 80 degrees.

5. A tape cassette according to claim 1, wherein said rear cover moves away from said tape-like member during a rotation of said front cover.

6. A tape cassette according to claim 1, wherein a height of said rear cover satisfies a specification value irrespective of the rotation angle of said front cover.

7. A tape cassette according to claim 1, wherein said tape cassette is a DVC (Digital Video Cassette).

* * * * *